INVENTOR.
MARCEL J.E. GOLAY
BY Harry M. Saragovitz
Attorney

Sept. 11, 1951 M. J. E. GOLAY 2,567,203
MULTIPLEX COMMUNICATION SYSTEM UTILIZING SUCCESSIVE, DIFFERENT PULSE MODULATION TECHNIQUES
Original Filed Feb. 5, 1946 8 Sheets-Sheet 2

INVENTOR
MARCEL JE. GOLAY
BY Harry M. Saragovitz
Attorney

INVENTOR.
MARCEL J.E. GOLAY
BY Harry M. Saragovitz
Attorney

Sept. 11, 1951 M. J. E. GOLAY 2,567,203
MULTIPLEX COMMUNICATION SYSTEM UTILIZING SUCCESSIVE, DIFFERENT PULSE MODULATION TECHNIQUES
Original Filed Feb. 5, 1946 8 Sheets-Sheet 4
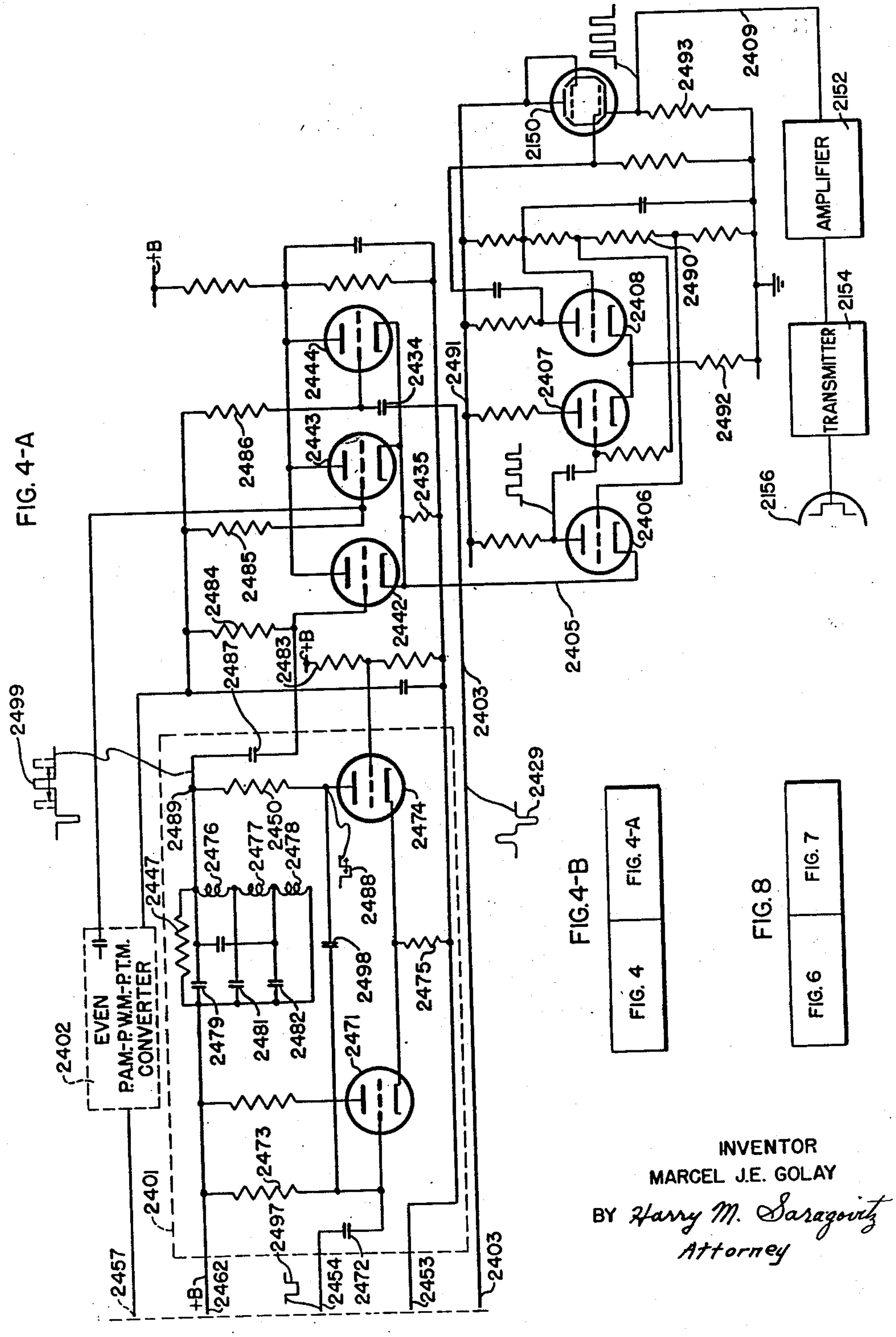
FIG. 4-A, FIG. 4-B, FIG. 8
INVENTOR
MARCEL J.E. GOLAY
BY Harry M. Saragovitz
Attorney INVENTOR
MARCEL J.E. GOLAY
BY Harry M. Saragovitz
Attorney Sept. 11, 1951 M. J. E. GOLAY 2,567,203
MULTIPLEX COMMUNICATION SYSTEM UTILIZING SUCCESSIVE, DIFFERENT PULSE MODULATION TECHNIQUES
Original Filed Feb. 5, 1946 8 Sheets-Sheet 6

INVENTOR.
MARCEL J.E. GOLAY
BY Harry M. Saragovitz
Attorney

INVENTOR
MARCEL J.E. GOLAY
BY Harry M. Saragovitz
Attorney

Sept. 11, 1951 M. J. E. GOLAY 2,567,203

MULTIPLEX COMMUNICATION SYSTEM UTILIZING SUCCESSIVE, DIFFERENT PULSE MODULATION TECHNIQUES

Original Filed Feb. 5, 1946 8 Sheets-Sheet 8

INVENTOR
MARCEL J.E. GOLAY
BY Harry M. Saragovitz
Attorney

Patented Sept. 11, 1951

2,567,203

UNITED STATES PATENT OFFICE 2,567,203

MULTIPLEX COMMUNICATION SYSTEM UTILIZING SUCCESSIVE, DIFFERENT PULSE MODULATION TECHNIQUES

Marcel J. E. Golay, Long Branch, N. J.

Original application February 5, 1946, Serial No. 645,679. Divided and this application June 2, 1947, Serial No. 751,941

6 Claims. (Cl. 179—15)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to low pass filters having a form of dispersionless delay lines which may be used, for example, as low pass filters with substantially no attenuation up to cut-off, or as a source of variously delayed signals for controlling the operation of communication systems. More particularly the invention relates to a multiplex pulse communication system in which the delay lines of the above mentioned type are used as electronic distributors.

This application is the divisional application of the parent application Serial No. 645,679, filed February 5, 1946, for Corrected Delay Line.

While the parent application discloses the dispersionless delay lines as well as the multiplex pulse communication system, this divisional application discloses only the multiplex pulse communication system. Therefore, for a more detailed description of the dispersionless delay lines, reference is made to the parent application.

It is therefore an object of this invention to provide a multiplex pulse communication system utilizing a delay line and a plurality of thermionic tubes as a multiplex electronic distributor for the system, and to provide novel circuits for synchronizing the transmitting and receiving distributors.

Still another object of this invention is to provide a method of energizing the phase-corrected delay lines.

Another object of this invention is to provide novel circuits for converting a single or a plurality of audio or video simplex signals into pulse-amplitude-modulated signals; pulse-amplitude-modulated signals into pulse-length-modulated signals; pulse-length-modulated signals into pulse-position-modulated signals at the transmitter, and reverse conversions of signals at the receiver.

As mentioned previously the description of the dispersionless delay lines may be found in the parent application and this application is restricted only to the application of a delay line having linear frequency phase characteristics to a multiplex pulse communication system, the line acting as a component of an electronic multiplex distributor for allocating the necessary time intervals to the respective channels at a multiplex transmitter, and for separating these individual channels at the multiplex receiver, whereupon the separated signals are directed to simplex receivers.

Thesse and other features of the invention will be understood more clearly from the following detailed description and the accompanying drawings in which:

Figures 4 and 4A are the schematics of a multiplex pulse-modulation transmitter;

Figure 4B illustrates the matching relationship of Figs. 4 and 4A with respect to each other;

Figure 8 illustrates the matching relationship of Figs. 6 and 7 with respect to each other;

Referring to Figs. 1 through 7, they disclose an application of a corrected delay line to a multiplex pulse modulation system in which the delay line acts as a multiplex distributor and a signal-sampling device. At the transmitter a plurality of simplex channels is connected to a multiplex transmitting station through the multiplex distributor, and at the receiver the received multiplex signals are separated into simplex signals by means of a synchronized multiplex distributor and directed into the respective simplex channels. In either case the distributor is of an electronic type keyed by the delay line, which, because of the rate of sampling of the simplex channels and large number of the simplex channels multiplexed over a single UHF channel, is the most practical type of electronic distributor that can perform the imposed task successfully.

Figure 1:
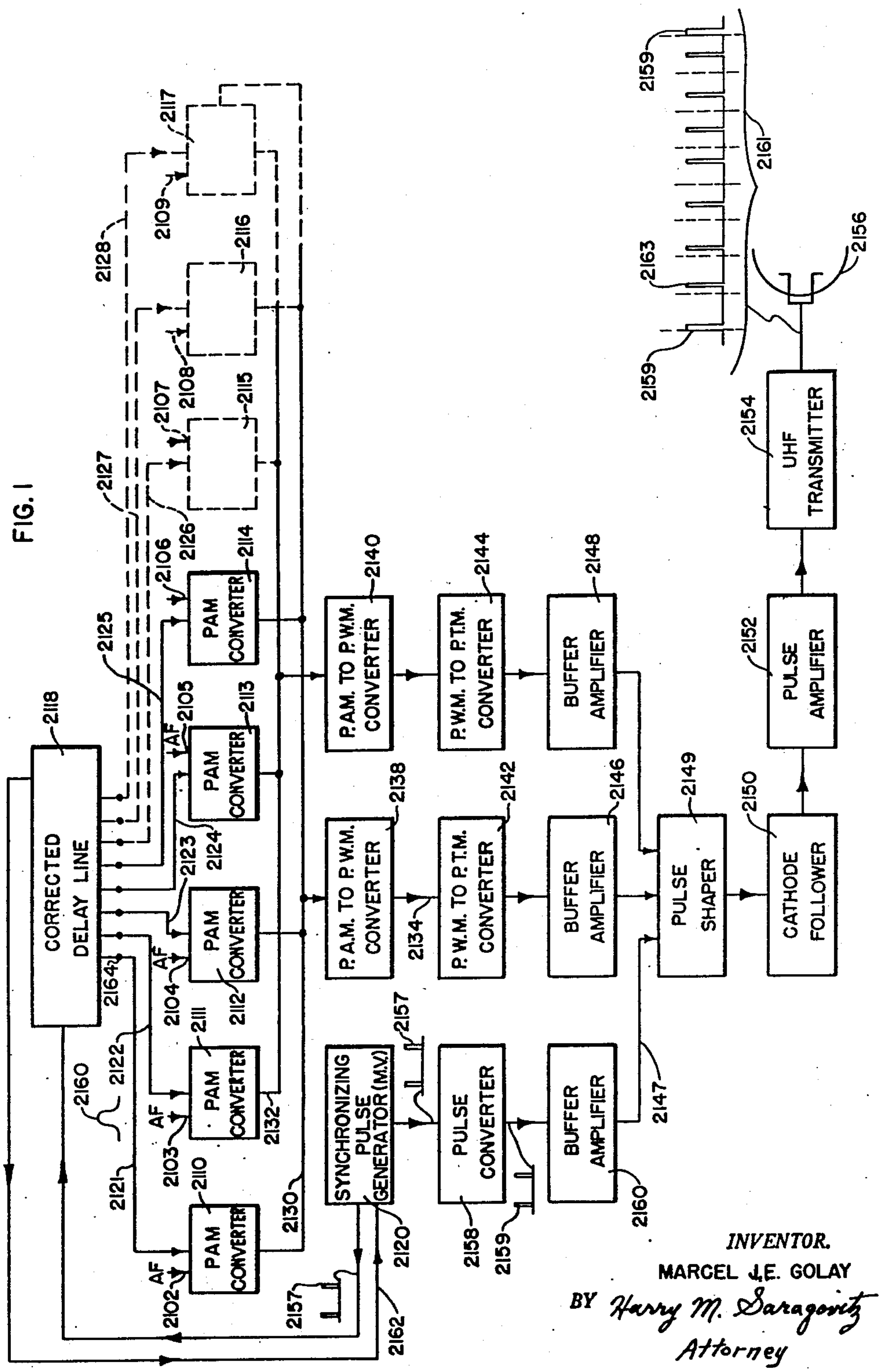
Figure 1 is a block diagram.

Referring to Figure 1, which is a block diagram of the transmitter, it discloses a plurality of simplex lines 2102 through 2109. The number of the simplex channels may be smaller or larger than the number indicated in the figure, eight channels having been selected for illustrating the principle of operation of the invention. The simplex channels 2102 through 2109 may carry either audio, video or telegraph signals. The simplex signals are impressed on pulse amplitude modulators (PAM) 2110 through 2117, which perform the function of sampling the signals impressed on the simplex channels at a sampling rate determined by the constants of a corrected delay line 2118, and, indirectly, by a pulse generator 2120 which energizes the delay line. The successive stages of the delay line 2118 are connected to the PAM's 2110 through 2117 over conductors 2121 through 2128 with the result that the modulators, which are normally non-conductive, are successively keyed by the delay line, making one modulator operative at any given instant. Examination of the connections between the delay line and the generators discloses the fact that each generator is connected to alternately successive sections of the delay line so that an output signal from an odd generator, such as generator 2110, is followed by an output signal from an even generator 2111. The outputs of the odd generators are connected to a common "odd" output bus 2130 while the outputs of the even generators are connected to a common "even" output bus 2132. Thus, while the sampling rate in the modulators is determined by the delay time T, furnished by the successive sections of the delay line, as illustrated at 22—1 in Fig. 2, the successive signals on the individual output busses 2130 and 2132 are separated from each other by a time interval T which facilitates the suppression of any cross modulation between the consecutive channels by allowing more time for the recovery of the PAM modulators, PAM-to-PWM converters 2138 and 2140, and of the PWN-to-PTM converters, as will be explained more fully later. The signals appearing on the busses 2130 and 2132 are impressed respectively on conductors 2134 and 2136 connected respectively to converters 2138 and 2140 which transform pulse amplitude modulation (PAM) to pulse width modulation (PWM). The outputs of the PAM-to-PWM converters are impressed on converters 2142 and 2144 which transform the pulse width modulation into pulse time modulation (PTM). These types of modulation, for the sake of clarity, are identified in Fig. 3. The respective types of modulation, i. e., PAM, PWM, and PTM, being illustrated at "A," "B" and "C" portions of the figure. The outputs of the PTM converters are impressed respectively on buffer amplifiers 2146 and 2148 whose outputs are connected to a series circuit including a pulse shaper 2149, a cathode follower 2150, a pulse amplifier 2152, a transmitter 2154, and a directive antenna 2156. A bus 2147 is also connected to a synchronizing pulse generator 2120 through a buffer amplifier 2160 and the shaper 2149 and a converter 2158 so that generator 2120 impresses the transmitter-receiver synchronizing pulses on transmitter 2154 and antenna 2156 at a rate determined by the pulse rate of generator 2120. The latter is under control of the delay line 2118, the last or the next-to-last section of line 2118 being connected to the generator over conductor 2162.

The operation of the system disclosed in Fig. 1 is as follows: the intelligence signals are impressed on the simplex channels 2102 through 2109; the pulse generator 2120 generates with the aid of the delay line 2118, widely spaced pulses 2157 which are impressed on the delay line 2118 and pulse converter 2158. The synchronizing pulse 2159 is derived from the pulses generated by pulse generator 2120, (also see an oscillogram 2161 illustrated next to antenna 2156). The synchroniizng pulses are thus transmitted without any delay by the transmitter. The pulses 2157 impressed on the delay line 2118 are delayed by the respective sections of the line, and the progressively more delayed pulses appearing at the outputs of the respective sections of the line are used for making the PAM's 2110 through 2117 operative for the interval of time determined by the duration, the amplitude, and the wave form of the line pulses, and by the biasing potential normally impressed on the PAM converters. The first keying pulse 2160 impressed on conductor 2121 is delayed by a time interval T, Fig. 2, by the first section of the delay line, which is interposed between a terminal 2164 of the line and conductor 2162, in order to provide sufficient recovery time thus permitting the receiver at the distant end to become prepared for properly receiving the succeeding channel pulses. PAM converter 2110 will therefore be allowed to transmit an intelligence signal 2163 from the simplex channel 2102. This intelligence signal 2163 is also illustrated as a signal 2202 in one multiplex channel signal illustrated in Fig. 2. The position of signal 2202 with respect to the synchronizing pulse 2204 is determined by the amplitude of the signal existing on the simplex channel 2102 at the instant of the appearance of the keying pulse on conductor 2121. Transformation of pulse amplitude modulation appearing in the outputs of the modulators 2110 and 2117 is performed by two parallel channels each of which includes a PAM-to-PWM converter, a PWM-to-PTM converter, and a buffer amplifier. The outputs of the buffer amplifiers 2146, 2148, and 2160, are all combined in the pulse shaper 2149, and the output of the latter is eventually impressed on the UHF transmitter 2154 and antenna 2156. The transmitted signals are illustrated at 2161, Fig. 1, and at 22—3 in Fig. 2, the marking or synchronizing pulses 2159 being transmitted at the beginning of each multiplex group of intelligence signals 2163.

It has been mentioned previously that it is desirable to have two parallel channels for the conversion of the PAM signals into the PTM signals in order to avoid cross talk and cross modulation between the adjacent simplex channels. The reason for this is as follows: the PAM generators, the PAM-to-PWM converters and the PWM-to-PTM converters include capacitive and inductive elements which will be variously energized in accordance with the amplitude of the impressed intelligence signals. After transmitting the sample signals these elements must be returned to their respective normal energy levels before being exposed to the next sample signals to avoid the "memorizing" of the previously processed signal, which, if not avoided, would result in cross talk or cross modulation between adjacent channels. This desirable "loss of memory" is accomplished to a sufficient degree, for practical purposes, by providing a rest period for each parallel channel equal to the duty period of the other, the rest period being used for returning each channel to its normal state. From what has been stated, it follows that the block diagram illustrated in Fig. 1 may be modified by impressing the outputs of all PAM generators 2109 through 2117 on a single converter channel; such modification, however, may introduce excessive cross talk between the simplex channels if the guard spaces 2206 and 2208 are made too short.

As mentioned previously, delay line 2118 is normally a corrected line which has substantially linear phase characteristic. The advantages of having the corrected line is that the pulses impressed on the PAM converters are uniform in shape, and, which is at least as important, the keying signals are substantially as sharp at the end of the line as at its beginning. The pulses derived from an uncorrected line lose their sharpness as they progress along the line, and they also undergo pronounced attenuation. Therefore, an uncorrected line may be used only if there is a large number of shaping amplifiers interposed between the line and the keyed tubes, which obviously complicates the system.

Figure 4:
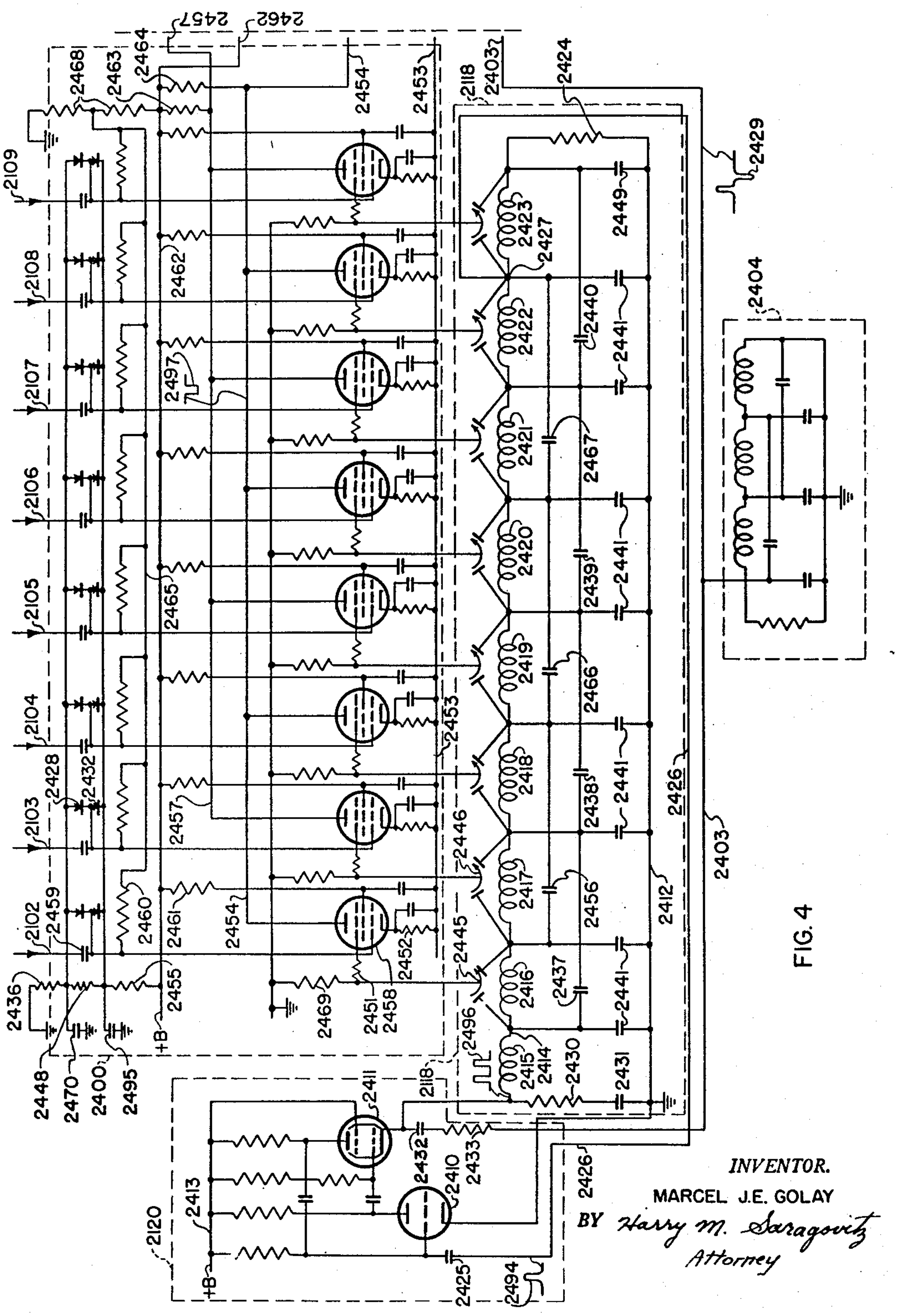

Referring now to Figs. 4 and 4A, whose relationship with respect to each other is illustrated in Fig. 4B, they disclose a schematic diagram of the multiplex transmitter whose block diagram is illustrated in Fig. 1. The corrected delay line 2118 is identified by the same numeral in Figs. 1 and 4. As in the case of Fig. 1, the line is connected to a pulse generator 2120. The pulse amplitude modulators are included in a block 2400, while the PAM-to-PWM and PWM-to-PTM converters are illustrated in blocks 2401 and 2402. Only the schematic diagram of converter 2401 is fully illustrated in the figure, the second converter, because of its identity with the first one, being indicated in a block form. The two buffer amplifiers 2442 and 2443 are connected to the respective outputs of the PAM-to-PWM-to-PTM converters, and buffer amplifier 2444 is connected to pulse generator 2120 over a conductor 2403, this connection also including a signal reflecting line 2404. The combined outputs of the three buffer amplifiers 2442, 2443 and 2444 are impressed over a conductor 2405 on pulse shapers 2406, 2407 and 2408, the output of the last stage being impressed on the grid of a cathode follower 2150 which corresponds to the cathode follower similarly numbered in Fig. 1. The output of the cathode follower is connected over a conductor 2409 to pulse amplifier 2152, and transmitter 2154 and antenna 2156.

Proceeding now with a more detailed description of Fig. 4, pulse generator 2120 comprises a pulse-controlled multivibrator circuit 2410—2411. Triode 2410 is connected with its cathode-plate circuit across a grounded bus 2412 and a +B bus 2413. The cathode of the beam tube 2411 is grounded through a conductor 2414, coils 2415 through 2423 of the delay line and a line terminating resistance 2424, while its plate is connected to bus 2413 through a resistance. The grid of triode 2410 is connected over condenser 2425 and a conductor 2426 to a junction point 2427 formed between the last and next-to-last sections of the delay line. Whether the connection of this grid is to the junction point 2427 or to the junction point 2428 depends upon whether the ascending or the descending portion of the signal will be instrumental in triggering the multivibrator. With the connections illustrated in the figure, triode 2410 is to be triggered by the descending portion of the positive pulse in the delay line. As in the case of the multivibrators, the control grid of one tube is coupled to the plate of the other, and vice-versa; the grids are also connected to bus 2413 through grid resistors. The output of the multivibrator is impressed on the artificial line 2118 which is shunted by the impedance a correcting series circuit consisting of resistance 2430 and a condenser 2431. Its output is also coupled through a condenser 2432 and a resistance 2433, conductor 2403 and a coupling condenser 2434 to the grid of buffer amplifier 2444 for combining the synchronizing pulses with the intelligence pulses appearing in the outputs of the amplifiers 2442 and 2443 in a common cathode resistor 2435. The synchronizing channel of the transmitter also includes a reflective delay line 2404 which transforms, with the aid of a reflected pulse, the pulse impressed on the grid of triode 2444 into a pulse 2429. The delay line 2118 connected to pulse generator 2120 is of the type in which the linear frequency phase relationship through the line is obtained by introducing a plurality of corrective capacities 2437 through 2440, 2456, 2466 and 2467. The remaining condensers 2441 are for completing the usual ladder type configuration of a delay line. The junction points of the delay line are connected by means of variable coupling condensers such as 2445, 2446, etc., to the suppressor grids of eight pentodes, which comprise the gated PAM stages of the transmitter. They correspond to the PAM stages 2110 through 2117 in Fig. 1. Since the connections of all PAM stages are identical, only the connections of a single pentode 2458 will be given. Its cathode is connected through a resistor 2452 to a grounded bus 2453 and its anode is connected to bus 2454 for the odd simplex channels, this bus corresponding to bus 2130 in Fig. 1. The outputs of the even pentodes, such as pentode 2455, are all connected to bus 2457 for the even simplex channels, this bus corresponding to bus 2132 in Fig. 1. The screen grids of all pentodes are connected through resistances, such as resistance 2461 to the positive bus 2462 which supplies the necessary positive potential to the screen grids and the plates, the plate connections being completed through plate resistors 2463 and 2464. All simplex channels are provided with copper oxide rectifiers, such as 2428 and 2432, which, together with the biassing resistors 2436, 2448, 2455 and by-pass condensers 2470 and 2495, act as amplitude limiters for the simplex signals. The simplex channels 2102 through 2109 are connected to the control grids of the pentodes through coupling condensers such as condenser 2459; grid resistors, such as 2460, connect the control grids to a common grid bus 2465, which is connected to a potentiometer 2468; this potentiometer impresses a sufficiently high positive potential on the control grids of the pentodes to produce class A amplification in the pentodes of the simplex channel signals. Resistor 2452 serves as cathode biassing resistor and its shunting condenser serves to prevent degeneration of the audio frequencies of the simplex channels. The suppressor grids of the pentodes, besides being connected to their respective delay line coupling condensers, are also connected through the suppressor grid resistors, such as resistances 2469 and 2451, to a common, grounded suppressor-grid-bus 2470. The potentials impressed on the suppressor grids of the pentodes are such as to make their plates normally nonconductive, and the plates are made conductive and thus are permitted to respond to the simplex signals only when a positive signal is impressed on their suppressor grids by the respective sections of the delay line. Thus the gated PAM stages perform a dual function: they act as an electronic distributor for the signals appearing in the simplex channels at a rate determined by the parameters of delay line 2118, and they also transform the audio signals into the PAM signals. The odd and even channel busses are connected to the PAM-to-PWM-to-PTM converters 2401 and 2402 where the PAM signals are converted into the PTM signals. Referring to the connections of the lower converter 2401, the connection between the odd bus 2154 and the grid of triode 2471 is accomplished through a coupling condenser 2472 and a grid resistor 2473, the latter connecting the grid to the positive bus 2462. Triode 2471 is normally fully conductive because of the positive potential impressed on its grid by bus 2462 through resistance 2473. The cathodes of triodes 2471 and 2474 are grounded through a common cathode resistor 2475, and the space current of triode 2471 is normally sufficiently high to so raise the common cathode potential of triodes 2471 and 2474 that triode 2474 is normally cut-off. The plate of triode 2474 is connected through a resistor 2459 and in parallel coils 2476, 2477 and 2478 and resistor 2449 to the +B bus 2462. The coils and condensers 2479 through 2482 form an out of phase reflecting line producing the PWM-to-PTM conversion of signals, as will be described later: resistor 2447, connected across the line input, is designed to dissipate the signals reflected from the other end of the line. The grid of triode 2474 is connected to a biassing potentiometer 2483 which impresses a positive potential on the grids of four triodes: 2474, 2442, 2443 and 2444. The latter three grids are connected to the same point on the potentiometer through resistors 2484, 2485 and 2486. The grid of triode 2442 is connected through a coupling condenser 2487 to a junction point 2489, while the grid of triode 2443 is connected to a similar point in the output of the even PAM—PWM—PTM converter. The outputs of the three buffer amplifiers are combined in the common cathode resistor 2435 and are impressed on the cathode of triode 2406 whose grid is connected to a potentiometer 2490 and whose plate is connected to a +B bus 2491. The plate of triode 2406 is connected through a blocking condenser to the grid of shaping amplifier 2407, this grid being connected also to potentiometer 2490. The cathodes of the triodes 2407 and 2408 are grounded through a common resistor 2492. A capacitive coupling between the plate of triode 2408 and the grid of cathode follower 2150 causes the latter to follow the plate potential of the former, and a cathode resistance 2493 of the cathode follower is connected to conductor 2409 leading to the amplifiers 2152, transmitter 2154 and antenna 2156.

The operation of the transmitter, Fig. 4, is as follows: The pulse generator 2120 is a pulse-controlled multivibrator whose parameters are calculated so that it impresses, during the conductive state of tube 2411, a pulse of proper duration on the delay line 2118. In one of the transmitters built by me multivibrator 2120 has a free-running repetition rate somewhat lower than 10 kc., 10 kc. being the desired repetition rate of the system. The connection 2426 from the penult end of the delay line to the grid of tube 2410 serves to control this multivibrator so as to make its actual repetition rate exactly equal to this desired repetition rate. When the pulse generated by the multivibrator has reached the junction point 2427 of the artificial line and the regenerative connection 2426 towards the end of its travel along the line, the voltage of the grid of tube 2411 is approaching that level at which tube 2411 is ready to become conductive again. The effect of the multivibrator-controlling pulse 2494, reaching the coupling condenser 2425, is momentarily to raise the voltage on the grid of tube 2410, and then to lower it during its downward excursion. Since grid 2410 draws slightly more grid current during the upward excursion of pulse 2494, the charge on condenser 2425 is increased during this period, and the downward excursion of pulse 2494 will lower the grid voltage of tube 2410 because of the discharge of condenser 2425 at this instant with the concomitant generation of a positive pulse 2495 at the plate of tube 2410. This positive pulse is impressed on the grid of tube 2411 making it conductive because the potential on the grid of triode 2411, as it will be recalled, had almost reached at this instant that level which makes tube 2411 conductive, the parameters of the multivibrator having been adjusted so as to make the free-running repetition rate of the multivibrator slightly longer than the desired repetition rate of the system. When tube 2411 is rendered slightly conductive, the multivibrator is immediately triggered and impresses a positive pulse 2496 on the main delay line. The positive pulses 2496 are impressed, after the introduction of fixed time-lags by the respective sections of delay line 2118, through the coupling condensers such as condensers 2445, 2446, etc., on the suppressor grids of the pentodes, which up to this instant had no plate current. Considering pentode 2458, it makes the plate of the latter momentarily responsive to the signals impressed by the simplex channel 2102 so that a sampling pulse of the simplex signal appears in the plate output of pentode 2458 as a negative signal 2497. The amplitude of this signal will be proportional to the amplitude of the simplex signal during the keying interval of pentode 2458. The operation of the remaining pentodes is identical to the operation of pentode 2458. The variable amplitude signals, such as 2497, of the odd simplex channels are impressed on the grid of triode 2471 through coupling condenser 2472. Triode 2471 is normally fully conductive because of the full plate potential impressed on its grid by +B bus 2462 through grid resistance 2473. When negative signal 2497 is impressed on the grid of this triode, it is rendered less conductive. Any decrease in the conductivity of triode 2471 produces a corresponding decrease in the voltage drop across cathode resistance 2475 with the result that the potential of the cathode of triode 2474 is lowered to the same extent. The grid of triode 2474 is connected to a fixed biasing potential—i. e., potentiometer 2483. Therefore, when the potential of the cathode of triode 2474 is lowered because of the decrease in the conductivity of triode 2471, triode 2474, having fixed biassing potential, becomes conductive, a negative rectangular pulse 2488 appearing in its plate circuit. This is impressed through condenser 2498 on the grid of triode 2471 so that this grid will be subjected to the dual action, the first being that produced by the negative pulse 2497, and the second action being produced by the negative pulse 2488 transmitted to this grid through condenser 2498 from triode 2474. The latter action is of the "one-shot" multivibrator type; the two negative signals combine and render triode 2471 completely nonconductive, the duration of the nonconductive state of triode 2471 being a function of the amplitude of the negative signal 2497. The time constants of the resistance-condenser combination 2464, 2473, and 2472 are so adjusted that the negative PAM signals of maximum amplitude are capable of keeping triode 2471 nonconductive through the greater portion of the interval allotted for the simplex channel, whereas the negative PAM signals of minimum amplitude cause triode 2471 to stay nonconductive through the smaller portion of said interval, Thus the lower is the amplitude of signal 2497, the longer is the time during which triode 2471 remains nonconductive, and the time required for the grid of triode 2471 to recover to the point where this triode becomes conductive again will be a function of the amplitude of the PAM signal. When tube 2471 has become sufficiently conductive, the reverse multivibrator action takes place through cathode resistance 2475, which again lowers the potential of the cathode of triode 2474 so that it becomes again nonconductive. Thus the effect of the variable amplitude PAM signal 2497 is to generate a substantially rectangular pulse 2488 of variable duration and therefore the PAM-to-PWM conversion takes place in the circuits of the triodes 2471 and 2474. The PWM signal is impressed on the delay line including the coils 2476, 2477, 2478, and the associated condensers, the termination of this line being such that the rectangular pulse 2488 impressed on the line is reflected 180° out of phase by the line termination back to the junction point 2489; the time-constant of the line is such that the negative rectangular signal 2488, and the positive reflected signal combine in part at the junction point 2489, and since the reflected signal is a delayed signal, the summation of these two signals at this junction point produces the signal illustrated at 2499. Since the position of the positive signal with respect to the negative signal will be a function of the duration of the rectangular signal 2488, the positive signal will be the desired PTM signal, the position of the positive portion of this signal with respect to the fixed position of the negative portion being substantially linear function of the amplitude of the PAM signal 2497. Thus the transformation of the PWM signal 2488 to PTM signal 2499 takes place at the junction point 2489, triode 2474 in combination with the reflecting delay line performing the function of the PWM-to-PTM converter.

The next required step is to suppress the undesired negative portion of signal 2499 and to transmit the useful positive PTM portion to the transmitter. This is accomplished by impressing the entire signal on the coupling condenser 2487 which is connected to the grid of buffer amplifier 2442. Amplifier 2442 is normally nonconductive, the positive potential impressed on the grid of the amplifier by potentiometer 2483 through the grid resistor 2484 being normally overcome by the positive potential impressed on its cathode by the cathode resistor 2435 because of the space current normally flowing through the normally conductive triode 2406 whose grid is connected to a fixed positive potential appearing on potentiometer 2490. Because of the normally nonconductive state of triode 2442, the negative portion of the PTM signal 2499 has no effect on this triode, and only the positive portion is capable of making is conductive. Since amplifier 2442 may be considered as a cathode follower, it renders triode 2406 nonconductive, positive potential being impressed on the cathode of the latter by the cathode resistance 2435 when the PTM signal makes the cathode follower 2442 conductive. The positive signals appearing in the plate circuit of triode 2406 are impressed on the grid of triode 2407, then triode 2408, and then cathode follower 2150, which in turn energizes the transmission line 2409 leading to the amplifiers 2152, UHF transmitter 2154, and antenna 2156, which results in the transmission of a UHF—PTM pulse by the antenna.

The operating cycle described thus far related to the transmission of the intelligence signals from the oddly numbered simplex channels. The transmitting cycle for the evenly numbered channels is identical to that just described except that a separate PAM-to-PWM-to-PTM converter 2402 is employed by these channels. The output of this converter is impressed on triode 2443, and it is in the output of this triode, and more particularly in the resistance 2435, that the signals from the odd and even channels are combined for their transmission to the receiver.

In order to maintain strict synchronism between the transmitter and the receiver, synchronizing pulses 2429 are transmitted to the receiver at the beginning of each sampling cycle so that the electronic distributor at the receiver is kept in strict synchronism with the electronic distributor of the transmitter. This is accomplished by impressing a portion of the output of multivibrator 2120 over condenser 2432 and resistance 2433 on conductor 2403 and pulse-forming, reflective, delay line 2404. When rectangular pulse 2496 is impressed on reflecting line 2404, the latter produces a 180° out of phase reflected pulse at the end of the line which is terminated to this effect, and the leading portion of the reflected negative pulse combines with the lagging portion of the positive pulse 2496, the two combined portions neutralizing each other. The resultant pulse 2429 consists of a positive pulse and a negative pulse, which are both impressed on the grid of triode 2444 over conductor 2403 and condenser 2434. Triode 2444 is normally nonconductive because of the positive potential normally impressed on its cathode by the cathode resistance 2435, the grid of this triode being connected to potentiometer 2483. The action of the triode 2444 is similar to the previously described action of triodes 2442 and 2443, the potentials normally impressed on their grids and cathode being mutually equal. When the positive portion of the synchronizing pulse 2429 is impressed on the grid of triode 2444, it is rendered conductive which in turn raises the potential of the cathode of triode 2406. From this it follows that the synchronizing pulse as well as all intelligence signals are combined in the cathode resistance 2435, and therefore the shaping amplifiers 2406, 2407, 2408 and the cathode follower 2150 preshape all signals before their transmission by antenna 2156.

Figure 5:
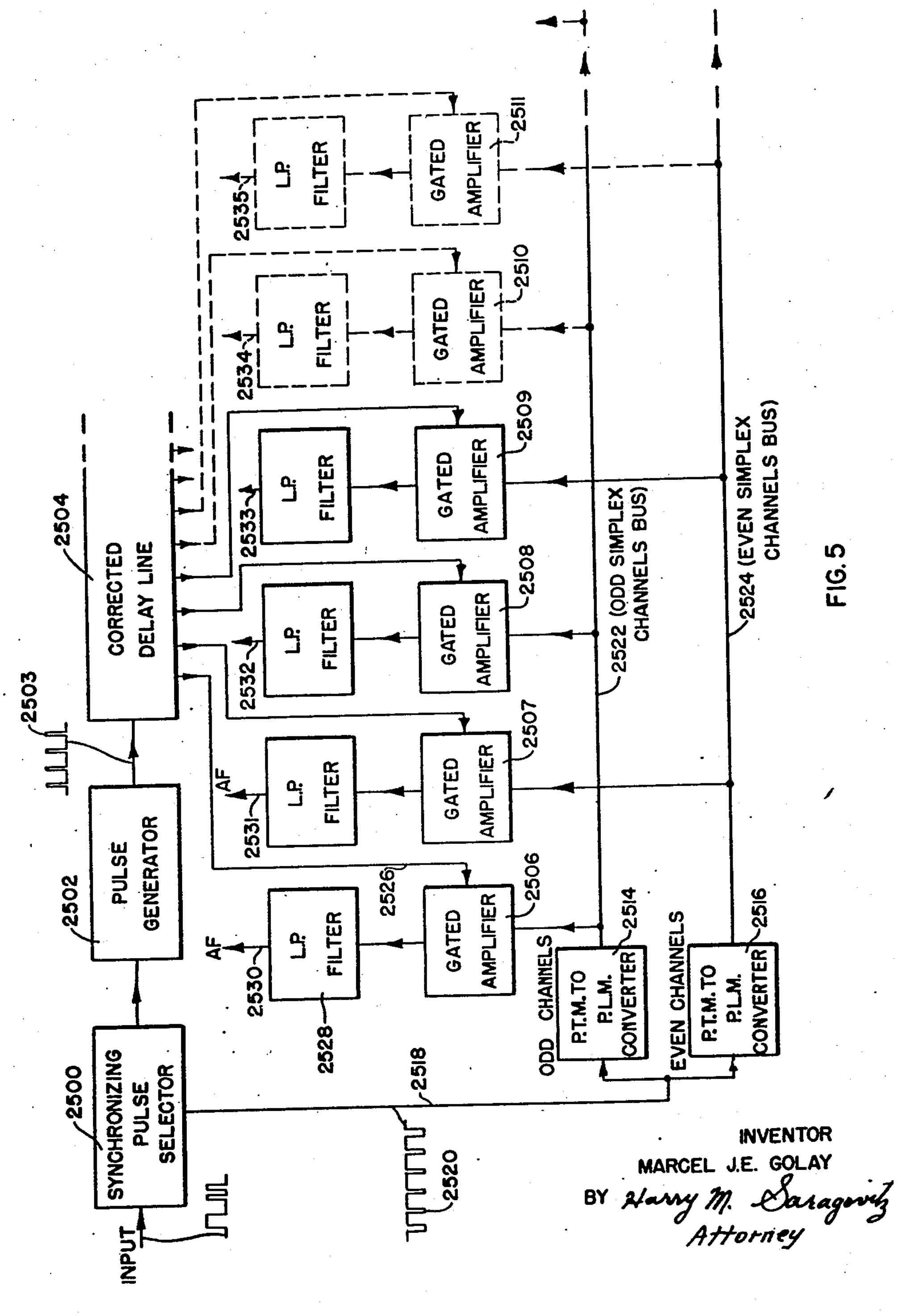
Figure 5 is a block diagram.

Referring now to Fig. 5, it discloses the block diagram of the receiver. In the receiver the modulation and conversion process taking place in the transmitter is reversed. All received signals after detection, conversion and amplification are impressed on a selector 2500 which selects the synchronizing pulse and impresses it on a pulse generator 2502; the latter is a pulse-controlled multivibrator, the synchronizing pulses controlling its timing. The positive pulses 2503 appearing in the output of the pulse generator are impressed on a corrected delay line 2504 and the sginals appearing in the successive stages of this line are used for making the gate amplifiers 2506 through 2511 operative in synchronism with the appearance of the respective simplex channel signals on their grids. Thus, these amplifiers, together with the corrected delay line, act as an electronic distributor for the multiplex channel signals impressed upon them through flip-flop multivibrator 2514 and 2516. Each flip-flop multivibrator is connected to the output of the inverter stage of selector 2500, which impresses negative signals 2520 on both multivibrators. Both multivibrators receive all signals impressed on them but one responds to the odd simplex signals only, while the other responds to the even simplex signals only, thereby causing the odd simplex signals only to appear on bus 2524, while the even simplex signals appear on bus 2522. Furthermore, each simplex signal in the even or odd sequence will affect only the amplifier to which it is assigned because the latter is rendered operative at this instant by the distributing pulse from the delay line 2506, all other amplifiers at that instant remaining inoperative. This is obtained by making the parameters of line 2504 equal to the parameters of the delay line 2118, Figs. 1 and 4, and by transmitting the line actuating pulses 2503 from the transmitter so that the line actuating pulses at the receiver are synchronized with the simplex signals. Thus amplifier 2506 will be rendered operative by the delay line 2504 at that instant when the simplex PTM signal from the simplex channed #1 appears on bus 2522. This simplex signal appears in the output of amplifier 2506 as a PWM signal, which acts as a PTM-to-PWM converter. The PWM signal is impressed on a low pass filter 2528 which transforms it into an AM intelligence signal and transmits it to an outgoing simplex channel 2530. The same cycle takes place in the remaining simplex channels 2531 through 2537.

Figures 2, 3, 6:
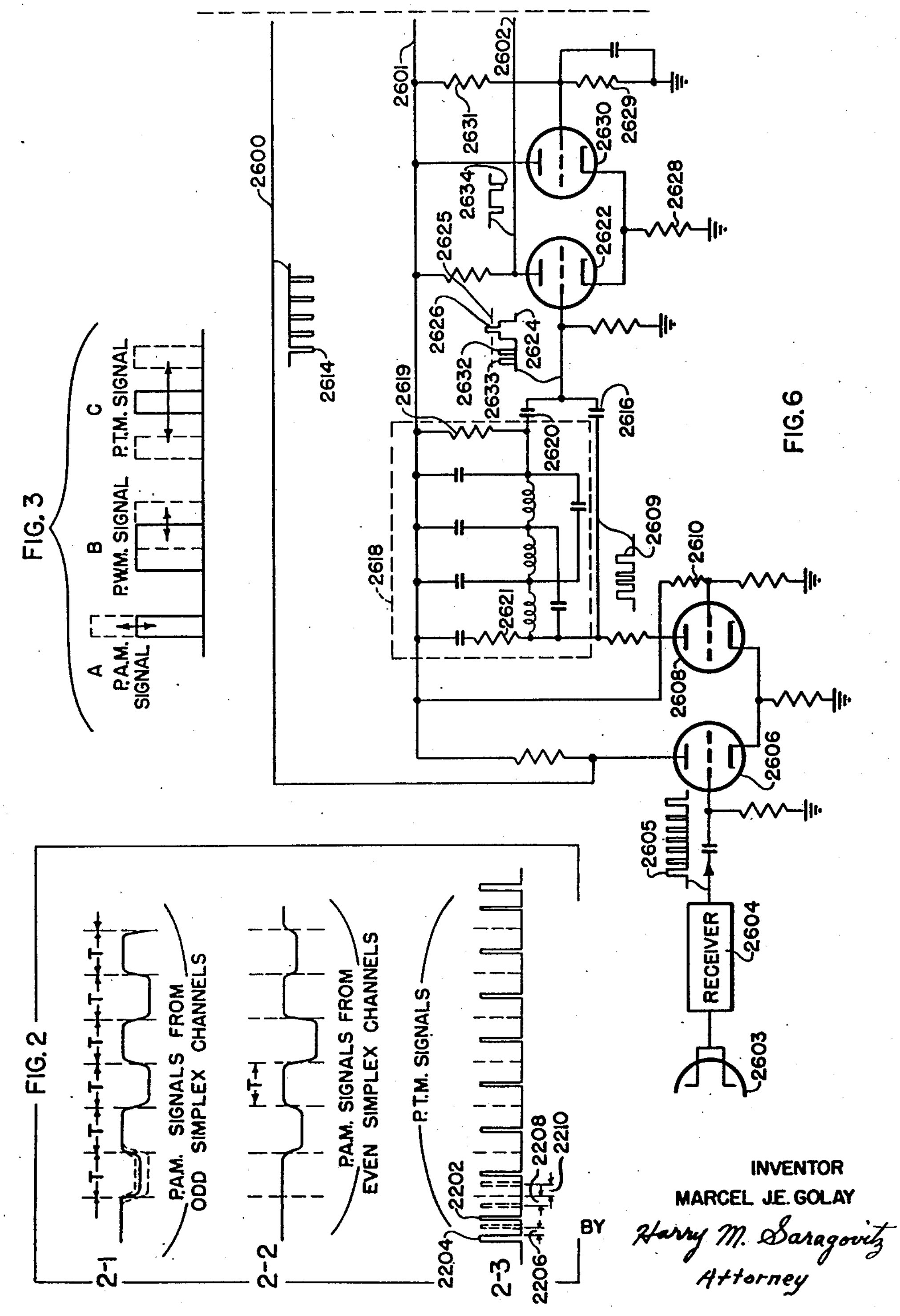
Figures 2 and 3 illustrate oscillograms of signals.
Figures 6 and 7 are the schematics of a multiplex, pulse-modulation receiver.
Figure 7:
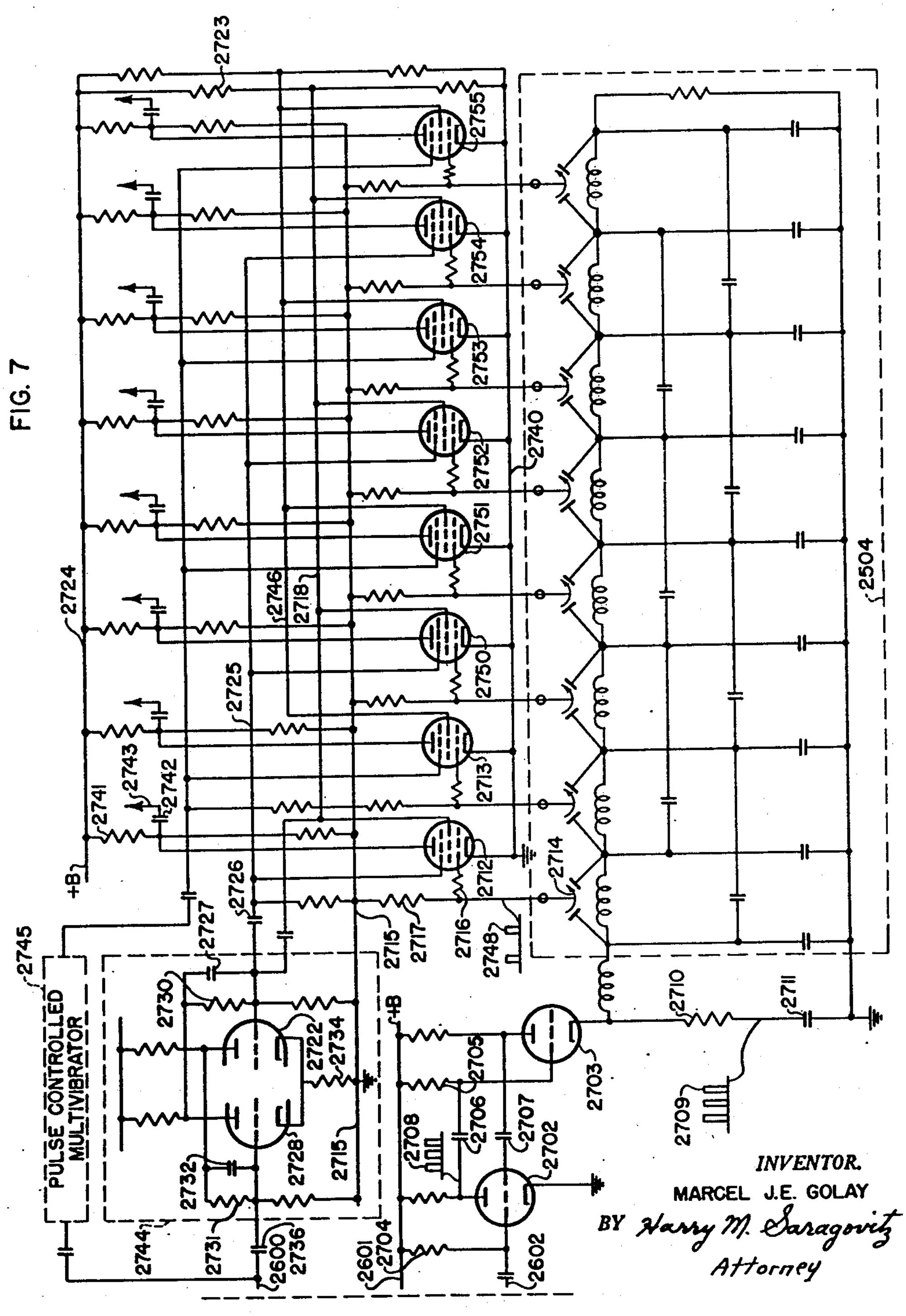
Figure 10:
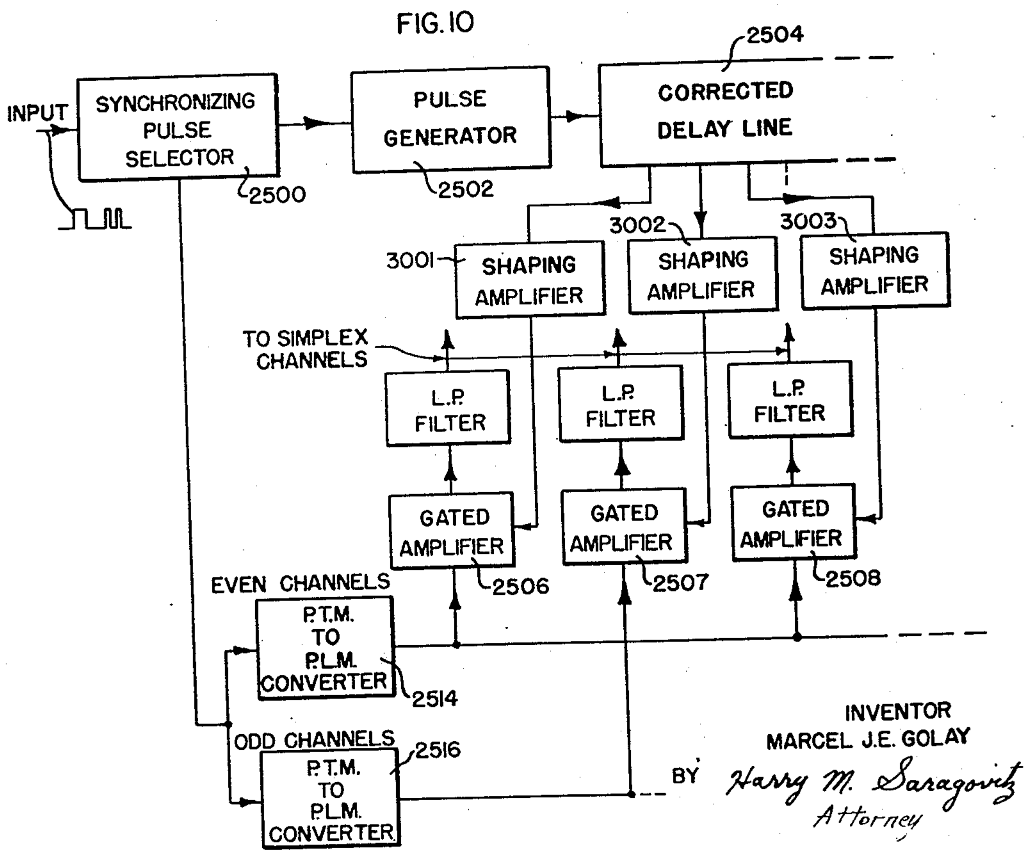

Figs. 6 and 7 disclose the schematic diagram of the receiver. The relationship of these figures with respect to each other is illustrated in Fig. 10, the two figures being connected to each other over three conductors 2600, 2601, and 2602, similarly numbered in both figures. The signals received by a receiving antenna 2603 are impressed on a receiver 2604 where they are detected and amplified, whereupon they are impressed as positive signals 2605 on the grid of a triode 2606. Triodes 2606 and 2608 act as pulse shaping amplifiers, triode 2608 being normally fully conductive because its grid is connected to the positive voltage of a potential divider 2610, while the grid of triode 2606 is connected to ground through a grid resistor. The positive signals 2605 are inverted and impressed as negative signals 2614 on conductor 2600. They also appear as positive signals at the cathode of triode 2608 thus making this triode nonconductive. Therefore, they are impressed as positive signals 2609 on a coupling condenser 2616 and a short, reflectionless delay line 2618 having terminating resistances 2619 and 2621. The output of the line is connected to a coupling condenser 2620 and the two condensers 2620 and 2616 are connected to the grid of a triode 2622. The signals appearing on the grid of triode 2622 are illustrated at 2624 and the normal biassing level of this grid is illustrated by a dotted line 2625. The delay introduced by the line is calculated to have the duration greater than that of the channel pulses but smaller than that of the synchronizing pulses, as illustrated at 2632 and 2633, signal 2633 being the reflection of the original PTM signal 2632. For this reason the direct and the delayed synchronizing pulses partially combine to produce the peaked pulse 2626, and because of the relatively low negative biassing potential level 2625 only the peak portion 2626 of the pulse makes triode 2622 conductive. Since the simplex signals do not combine as illustrated at 2632 and 2633, they are blocked at triode 2622 and have no effect on the circuits connected to the output of triode 2622. The cathode of triode 2622 is connected to ground over a cathode resistance 2628, and it is also connected to the cathode of a triode 2630 whose grid is connected to the positive voltage of a voltage divider formed by resistances 2629 and 2631. Therefore, triode 2630 is normally fully conductive and its conductive state keeps the cathode of triode 2622 at a sufficiently high positive potential to keep triode 2622 normally nonconductive. The peak portion 2626 of signal 2624 appears as a negative pulse 2634 in the plate circuit of triode 2622 and is impressed on conductor 2602, a coupling condenser 2700, and the grid of a triode 2702, which, together with a triode 2703, forms a pulse-controlled multivibrator circuit. Since the grid of triode 2702 is connected to the positive bus 2601 over a resistance 2704, triode 2702 would be normally fully conductive if it were not for a condenser 2707 which connects the grid to the plate of triode 2703. The same is true of triode 2703 whose grid is connected to the same bus over a resistance 2705 and to the plate of triode 2702 through a coupling condenser 2706. Because of the condensers 2706 and 2707, the potentials on the grids are now determined by the state of charge on the condensers 2706 and 2707, and whether the condensers are charging or discharging. When negative signal 2634 is impressed on the grid of triode 2702, this triode, which will be assumed to be conductive at the time, is rendered less conductive so that a positive signal is impressed on condenser 2706 and the grid of triode 2703. It will be assumed that triode 2703 has almost reached that state which makes it conductive at that time. Therefore positive signal 2708 makes triode 2703 conductive and the multivibrator is triggered to its second state of equilibrium for a time determined by its parameters which are so chosen that a positive pulse 2709 of the desired duration is impressed on delay line 2504 by means of input impedance 2710—2711. At the end of this cycle the multivibrator reverses to its previous state, and the grid voltage of triode 2703, which is now cut off, begins to rise, the time constant of the multivibrator, as mentioned before, having been so chosen that this voltage approaches that needed for making triode 2703 conductive when the next synchronizing signal is received. It thus will be noted that the circuits of the receiver described so far select the synchronizing pulses and impress them on the corrected delay line 2504. The intelligence signals do not have any effect on the delay line 2504 since they do not appear in the output of triode 2622 because the high blocking potential impressed on the grid of triode 2622; moreover, while the relatively long synchronizing pulses produce superimposition of the direct and reflected signal as illustrated at 2626, the intelligence signals which are of shorter duration produce a series of direct intelligence signals, such as signal 2632, and a series of reflected signals such as signal 2634, the direct and the reflected signals being spaced apart as illustrated in the oscillogram; therefore they are all blocked at triode 2622 and have no effect on the corrected delay line 2504.

Proceeding now with the description of the multiplex distributor of the receiver, the control grid of a pentode 2712 is coupled to the first section of the delay line through a condenser 2714 and resistances 2716 and 2717, resistance 2716 controlling the maximum amplitude of the signal impressed on the grid. Resistor 2717 connects this grid to a grounded bus 2715. The screen grid of the pentode is connected to a screen grid bus 2718. One end of this bus is coupled through a condenser 2720 to the grid of a triode 2722, while its opposite end is connected through a resistance 2723 to a +B bus 2724. The suppressor grid is connected to a suppressor grid bus 2725, this bus being grounded through a grid lead resistance 2719; the bus is also coupled through condensers 2726 and 2727 to the plate of a triode 2728. Condenser 2727 is shunted by a resistance 2730; a similar connection 2731—2732 exists between the grid of triode 2728 and the plate of triode 2722, the condenser-resistance combinations 2727—2730 and 2731—2732 comprising the well known flip-flop multivibrator connections between the grids and the plates of the two triodes. The cathodes of the triodes 2722 and 2728 are connected to the grounded bus 2715 through a common cathode resistor 2734. The grid of triode 2728 is connected over a coupling condenser 2736 to conductor 2600 which impresses the negative synchronizing and simplex signals 2614 on the grid of this triode. From the connections of the triodes 2728 and 2722 it follows that they represent the double stability or flip-flop version of the Echles-Jordan multivibrator circuit, the modification residing in the fact that the grid of triode 2728 is connected to one source of pulses, while the grid of triode 2722 is connected to the other source of pulses.

The operation of this flip-flop multivibrator and of pentode 2712 is as follows: it will be assumed that the normal state of the multivibrator is such that triode 2722 is conductive and triode 2728 nonconductive, a condition which will be found to exist because the last preceding signal applied to the grid of triode 2728 over conductor 2600 by inverter 2606 was either a negative simplex pulse or a negative synchronizing pulse. When the delay line 2504 impresses a positive pulse 2748 on condenser 2714, the control grid of pentode 2712 draws a small grid current. This grid current somewhat flattens the peak portion of the pulse impressed upon it by the artificial line because of the voltage drop in resistance 2716, which limits the positive potential appearing on the grid to a predetermined maximum value. When pentode 2712 is rendered conductive, a space current flows from the cathode to the plate, and through resistance 2741 to bus 2724. The screen grid current also increases thus lowering the potential of bus 2718, a negative pulse being transmitted to the grid of triode 2722 through condenser 2720. When the potential of the grid of triode 2722 is thus made lower than the potential normally impressed upon it at the time when triode 2728 is nonconductive and triode 2722 fully conductive, triode 2722 is made less conductive, and triode 2728 becomes conductive because of multivibrator action thus initiating the triggering of the flip-flop circuit, which results in the triode 2728 becoming fully conductive and triode 2722 nonconductive. As triode 2728 becomes fully conductive, a negative pulse is impressed by the plate circuit of triode 2728 on the suppressor grid bus 2725 through the condensers 2727 and 2726 and through this bus on the suppressor grid of pentode 2712. This negative pulse cuts off the plate current of pentode 2712, thereby causing a slight increase in the screen grid current, and a corresponding decrease in the potential of the screen grid bus 2718 because of the increase in the IR drop across resistance 2723 connecting the screen bus to the +B bus 2724. This lowering of the screen grid bus potential is transmitted to the grid of triode 2722, which in turn lowers the screen potential still farther, thus obtaining a regenerative action which assists the retention of the flip-flop circuit in its new state of conductivity, i. e., triode 2722 being nonconductive and triode 2728 fully conductive. The new condition just described will persist until the negative simplex pulse from the first simplex channel, which is made to appear during the keying interval of pentode 2712, is impressed on the grid of triode 2728. This pulse causes the flip-flop circuit to reverse its electrical position, triode 2728 becoming cut-off. A positive pulse now appears in its plate circuit which is impressed on the suppressor grid of pentode 2712 through the condensers 2727 and 2726 which makes the plate of pentode 2712 to draw current again. This reappearance of plate current is accompanied by a slight decrease in the screen current, and consequently a slight rise in the screen voltage which is transmitted through condenser 2720 to the grid of triode 2722, thus regeneratively assisting the above reversal of conductivity in the multivibrator. It will be noted that the multivibrator has thus reverted at this instant again to its original position, namely, 2728 cut-off and 2722 fully conductive, which is the one assumed at the beginning of this description. The state of the plate conductivity of pentode 2712 will now continue until the original line pulse disappears, at which time the plate and the screen grid of pentode 2712 ate both cut-off. It will be noted that the blocking of pentode 2712 does not affect the flip-flop circuit since the resulting application of a positive pulse to the grid of the already fully conductive triode 2722 cannot make it more conductive. It is now proper to stress the fact that the duration of the last conductive state of the plate of pentode 2712 will vary linearly with the time of occurrence of the simplex channel pulse with respect to the marker pulse, thereby generating a width-modulated pulse in the plate circuit of pentode 2712, which after being impressed on condenser 2742, conductor 2743 and subsequent suitable low pass filtering enables the reproduction of the original audio or video signal of the first simplex channel sent by the transmitter. This separation of the simplex signals and their demodulation is reproduced at the succeeding channels and since it is identical to the functional cycle of channel #1 given above, needs no repetition. It should also be noted that the negative marker pulse does not affect the position of the flip-flop circuit, since a negative pulse applied to the grid of triode 2728, which had already been thrown into the nonconductive state by the last simplex pulse, has no effect on the multivibrator. Likewise, the odd channel pulses will not affect the position of the even channel flip-flop circuit and vice-versa.

Figure 11:
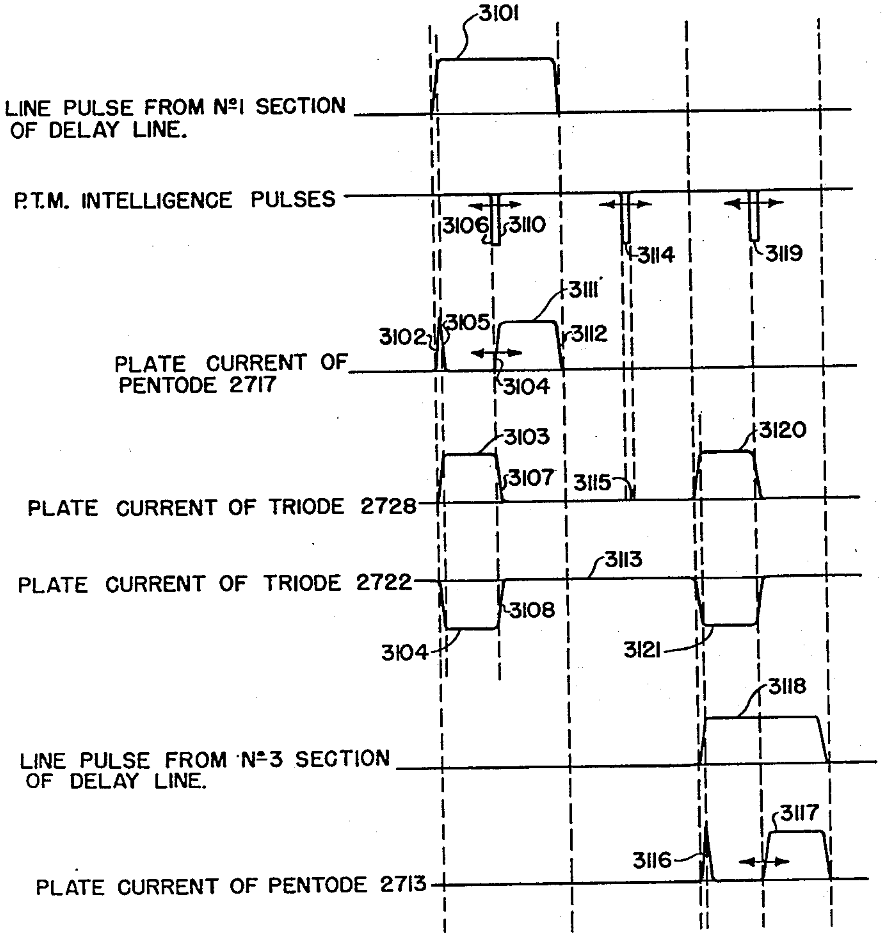
Figure 11 illustrates signal oscillograms used to aid the understanding of the functioning of the receiver.

In the description of the functional cycle of pentode 2712 and of the flip-flop multivibrator 2728—2722, it has been stated that the pentode 2712 is made conductive when the keying delay line pulse is impressed on its control grid, this pulse appearing in the simplex channel as a constant frequency pulse, the frequency of this pulse being determined by the sampling rate of the multiplex system. When this constant frequency pulse interferes with the intelligence signal which is, for instance, the case when the sampling rate is in the audio frequency range and the intelligence signals are audio frequency signals, it becomes necessary to suppress the signal in the simplex channel by means of an additional band pass filter. Since such filtering of the sampling frequency in the simplex channels is known in the art, this additional filtering has not been indicated in any of the diagrams. The functional cycle of the multivibrator 2744 and of pentode 2712, by the way of a summary of the functional cycle of these elements, is also illustrated in Fig. 11, by means of oscillograms of the signals appearing in these circuits. Referring to Fig. 11, a line pulse 3101 is generated by the first section of the line and impressed on the control grid of pentode 2712 through coupling condenser 2714. The immediate effect of this pulse is to make pentode 2712 fully conductive as illustrated by the rising portion 3102 of the plate current in the pentode. However, making of this pentode fully conductive lowers the potential of the screen grid bus 2718 and as a result of this lowering of the screen grid bus potential the multivibrator is fipipped into the state of conductivity indicated at 3103 and 3104, triode 2722 becoming nonconductive and 2728 conductive. The conductive state of triode 2728 lowers its plate potential and since this plate is coupled to the suppressor grid of pentode 2712, the plate current of the latter is cut off as illustrated at 3105. The multivibrator has been thus flipped into the position which allows it to respond to the PTM intelligence pulse, this flipping having been performed by the line pulse impressed on the pentode. Accordingly, when the negative leading edge 3106 of PTM intelligence pulse is impressed on the rigid of triode 2728, it flops the multivibrator back into its normal state of conductivity as illustrated at 3107 and 3108 with triode 2728 becoming nonconductive and its plate voltage rising to the potential of the +B bus. This rise of plate potential is transmitted to the suppressor grid of the pentode with the result that the full plate current again flows in this pentode as illustrated at 3109. The multivibrator's parameters are so adjusted that it remains in this state of conductivity when the PTM signal disappears, as illustrated at 3110, and, therefore, in spite of the disappearance of the PTM signal, pentode 2712 remains conductive, as illustrated at 3111, until the disappearance of the line pulse 3101 which makes pentode 2712 again nonconductive, as illustrated at 3112. Making pentode 2712 nonconductive produces a corresponding rise in the potential of the screen grid bus 2718 which has no effect on the multivibrator since triode 2722 is already fully conductive as illustrated at 3113. Examination of the current pulses produced in the plate circuit of pentode 2712, which are illustrated at 3102, 3105, 3109, 3111 and 3112, reveals the fact that a pulse 3102—3105 of fixed amplitude and fixed duration is produced first, and this pulse is followed by a PWM pulse 3109—3111—3112, the position of the leading edge 3109 of the latter being determined by the time of occurrence of the PTM pulse 3106. This PWM pulse is impressed on the previously mentioned filter where it produces the desired intelligence signal. The fixed amplitude and fixed duration pulse 3102—3105, is filtered out by the previously mentioned hand pass filter. Fig. 11 also illustrates the fact that the succeeding PTM intelligence pulse 3114 has no effect on pentode 2712 nor any subsequent odd pentodes because none of these pentodes are under the influence of the positive pulses from the corrected delay line 2504. The intelligence pulse 3114 does not have any effect on the multivibrator 2728—2722 either because triode 2728 is already nonconductive, as illustrated at 3115, and as a consequence all evenly numbered PTM intelligence signals are blocked by the odd multivibrator 2744. However, they will get through the even multivibrator 2745 and one of the pentodes, in this instance pentode 2713, pulse 3114 being the pulse from the second simplex channel. Fig. 11 also illustrates the idealized oscillograms of the signals which make pentode 2750 conductive, the signals produced in this pentode being illustrated at 3116 and 3117. The line pulse which is impressed on pentode 2750 by the third section of the delay line 2504 is illustrated at 3118 and the PTM intelligence pulse transmitted from the third simplex channel is illustrated at 3119. The behaviour of the multivibrator 2744 is illustrated at 3120 and 3121. Examination of these signals reveals the fact that they represent no more but a repetition of the functional cycle that has taken place previously in multivibrator 2744 and in pentode 2712.

Thus at the receiver the multivibrators 2744 and 2745 block the synchronizing pulses and the intelligence signals from the odd simplex channels produce PWM signals in the respective odd pentodes, while the evenly numbered simplex channels produce similar signals in the evenly numbered pentodes with the aid of the even multivibrator 2745.

While in the described applications of the delay lines the keying signals for controlling the simplex channels are derived from each successive section of the delay line, there may be cases in which the signal thus derived is not sufficiently sharp to perform its selection properly. In such cases it will be advantageous to utilize a delay line having two or three sections or even a greater number of sections from each simplex channel so that a keying signal is derived from every other section or every third section, etc., of the line. In the arrangement just described although the total delay per channel remains the same, which is accomplished by decreasing the time constant of each section, such decrease in the time constant allows each section to pass a correspondingly wider frequency band, which produces keying pulses possessing better wave-form. The above modifications are therefore hereby made a part of this disclosure.

Figure 9:
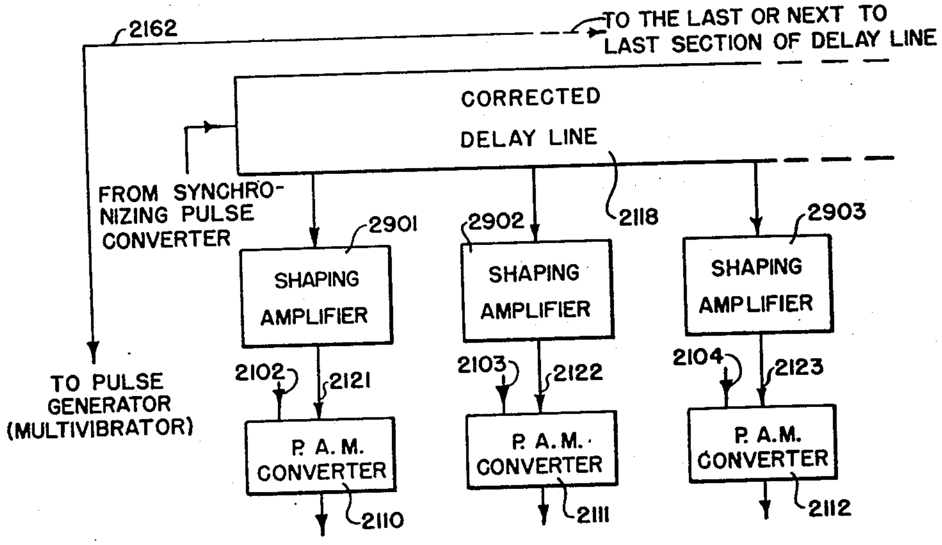
Figures 9 and 10 are modified block diagrams of the multiplex transmitter and receiver.

The above mentioned results, i. e., sharper keying pulses, may be also obtained by deriving the keying pulses from each successive section of the delay line, as described previously, and by impressing these pulses on shaping amplifiers, as illustrated in Figs. 9 and 10. Fig. 9 illustrates a portion of the block diagram of the transmitter of Fig. 1, with the similar elements being similarly numbered in both figures. The delay line 2118 in both figures has the same total number of sections and there is the same number of simplex channels; the wave-form of the keying pulses is improved by inserting shaping amplifiers 2901, 2902, 2903, etc., between the line and the PAM converters. The same method of improving the keying pulses at the receiver is illustrated in Fig. 10, in which case the shaping amplifiers 3001, 3002, 3003, etc., are inserted between the line and the gated amplifiers 2506, 2507, 2508, etc.

In Figs. 4 and 7 the line coupling condensers, such as condensers 2445 and 2446 in Fig. 4 and condenser 2714 in Fig. 7, are coupled to the outputs of two line sections so that the keying pulse impressed on the pentodes is a pulse which is produced as a result of the summation of two adjacent pulses generated by the adjacent line sections. The advantage of such arrangement resides in the fact that since the coupling condenser is a two-section variable condenser, it is possible to vary the occurrence of the keying pulse by varying the degree of coupling of the two sections of the coupling condenser to the adjacent sections. When this degree of coupling is varied so as to produce a closer coupling between the leading section of the line, the occurrence of the resultant keying pulse is made earlier and when the degree of coupling is reversed the resultant keying pulse is delayed. While this is the preferred arrangement for coupling the delay line with the pentodes, it is to be understood that coupling of the pentodes to two adjacent sections may be dispensed with, in which case they are coupled only to a single section. The limitation of this arrangement resides in the fact that the adjustment of the time of occurrence of the keying pulses is then no longer available, and should it be necessary to make slight adjustments in the time of occurrence of the keying pulses, it will be necessary to obtain them by adjusting the inductances and the capacitances of the individual line sections. The latter arrangement is obviously more difficult of realizing from a practical point of view than the one disclosed in the figures.

When the delay line is of the type which utilizes several sections for each simplex channel, which is, as mentioned previously, may be resorted to in order to improve the wave-form of the keying pulses, the individual sections of the coupling condensers are again connected to the adjacent sections as illustrated in Figs. 4 and 7, sufficient time adjustment of the keying pulses being obtained with this type of connection even though the delay furnished by each section has been reduced.

The multiplex distributors have been illustrated with the individual pentode tubes being used as individual electronic switches for the respective simplex channels. While this is one possible arrangement, it is to be understood that the pentodes may be replaced with other known electronic switching circuits, such as those disclosed in the applications for patent of William A. Huber et al., entitled, "Radio Object Locating System," Serial No. 478,862, filed March 12, 1943, and William A. Huber et al., entitled, "Radio System," Serial No. 518,934, filed January 20, 1944.

In the disclosed multiplex pulse-modulated system, the transmitted signals are pulse time modulated signals. It is to be understood that the multiplex distributor per se is applicable to the systems using any type of pulse modulation as a means of transmitting intelligence, and therefore the additional conversions of one type of pulse modulation into the other type illustrated in Fig. 1, such as from PAM-to-PWM, and PWM-to-PTM, may be omitted if pulse amplitude modulation is selected for transmitting the intelligence signals.

While the invention has been described with reference to several particular embodiments, it will be understood that various modifications of the apparatus shown may be made within the scope of the following claims.

I claim:

1. A multiplex transmitter including a synchronizing pulse generator, a phase-corrected, multisection delay line connected to said generator, a plurality of simplex transmitting channels, a corresponding plurality of thermionic vacuum tubes connected to the respective simplex channels and to the respective, successive sections of said line, said tubes being numbered in the order of their successive excitation by a pulse travelling along said line, first and second multiplex busses connected to the outputs of said tubes, the outputs of the even-numbered tubes being connected to said first bus and the outputs of the odd-numbered tubes being connected to said second bus, the respective sections of said line making said tubes periodically operative to transform the simplex signals appearing in said simplex channels into pulse-amplitude-modulated signals at said busses, a pulse-amplitude-modulation-to-pulse-width-modulation converter and a pulse - width - modulation - to - pulse - time-modulation converter in series therewith connected to each of said busses, and a transmitter having a connection to the outputs of the last two converters and to said generator, said transmitter transmitting said simplex signals as a series of pulse-time-modulated signals preceded by a transmitted synchronizing signal from said generator.

2. A multiplex transmitter according to claim 1, wherein said busses comprise a source of negative pulse-amplitude-modulation signals, and said pulse - amplitude - to - pulse - width - modulation converter includes a one shot multivibrator connected to said source, said multivibrator including a first normally fully conductive triode with the grid of said first triode being connected to the positive terminal of a source of potential through a grid resistance and to said source through an input condenser, a second normally nonconductive triode, a common cathode resistance for said first and second triodes, the grid of said second triode being connected to a fixed source of positive potential, and a multivibrator condenser connected from the plate of said second triode to the grid of said first triode, said negative pulse-amplitude-modulation signal making said first triode less conductive, and said second triode conductive, whereby said multivibrator condenser renders said first triode completely nonconductive, and said second triode fully conductive for a period of time proportional to the amplitude of said pulse-amplitude-modulation signal; whereby the signal appearing in the plate of said second triode is a negative pulse-width-modulated signal.

3. A multiplex transmitter, comprising a synchronizing pulse generator, a plurality of simplex channels for supplying amplitude modulated signals, a delay line connected to said generator for deriving a series of successive keying pulses from each of the pulses from said generator, said line having a plurality of delaying sections corresponding in number to that of said simplex channels, an electronic switch for each channel connected to said respective delay line sections for actuation thereby, a plurality of means, each including a pulse-width-to-pulse-time modulation converter, respectively connected to receive the output of alternate channels, said switches forming operative links between said channels and the corresponding converter, circuit means for mixing the output of said converters and of said synchronizing generator, and means for transmitting the mixed signals from said mixing circuit means.

4. A transmitter according to claim 3, wherein said delay line comprises a phase corrected delay line having a phase correcting component, and further including means comprising a feedback from a point on said delay line to said generator for controlling the pulse recurrence rate of said pulse generator.

5. A multiplex transmitter comprising a synchronizing pulse generator, a plurality of simplex channels for supplying amplitude modulated signals, a delay line connected to said generator for deriving a series of successive keying pulses from each of the pulses from said generator, said line having a plurality of delaying sections corresponding in number to that of said simplex channels; an electronic switch for each channel connected to said respective delay line sections for actuation thereby, a plurality of circuits each of which includes a pulse-amplitude-to-pulse-width modulation converter and a pulse-width-to-pulse-time modulation converter connected in series, the inputs of said pulse-amplitude-to-pulse-width modulation converters being respectively connected to receive the outputs of alternate electronic switches, said switches forming operative links between said channels and the corresponding converter, circuit means for mixing the outputs of said pulse-width-to-pulse-time modulation converters and of said synchronizing generator, and means for transmitting the mixed signals from said mixing circuit means.

6. A multiplex transmitter including a synchronizing pulse generator, a synchronizing pulse converter with a connection to said generator, a delay line connected to said generator, said generator energizing said line at the sampling rate of said transmitter, a multiplicity of simplex channels, a corresponding multiplicity of thermionic vacuum tubes interconnecting said channels and said line, each tube having a plurality of control electrodes, one control electrode of said tube having a connection to a simplex channel and another control electrode of said tube having a connection to a point of said line, said line and said tubes acting as a multiplex transmitting distributor inter-connecting said simplex channels with said multiplex transmitter, a plurality of common output circuits for as many groups of tubes, the tubes of a group having connections to said line which are separated by the connections of tubes of other groups, whereby simplex signals appear in said outputs successively and in repetitive order, and a mixer circuit to combine the outputs of said converter and said output circuits.

MARCEL J. E. GOLAY.

REFERENCES CITED

The following references are of record in the file of this patent:

UNITED STATES PATENTS

| Number | Name | Date |
|---|---|---|
| 1,264,517 | Herink | Apr. 30, 1918 |
| 2,172,354 | Blumlein | Sept. 12, 1939 |
| 2,199,634 | Koch | May 7, 1940 |
| 2,244,239 | Blumlein | June 3, 1941 |
| 2,262,838 | Deloraine | Nov. 18, 1941 |
| 2,266,401 | Reeves | Dec. 16, 1941 |
| 2,358,152 | Earp | Sept. 12, 1944 |
| 2,380,982 | Mitchell | Aug. 7, 1945 |
| 2,391,776 | Fredendall | Dec. 25, 1945 |
| 2,403,210 | Butement | July 2, 1946 |
| 2,406,978 | Wendt | Sept. 3, 1946 |
| 2,408,077 | Labin | Sept. 24, 1946 |
| 2,416,330 | Labin et al. | Feb. 25, 1947 |
| 2,425,066 | Labin et al. | Aug. 5, 1947 |
| 2,426,205 | Grieg | Aug. 26, 1947 |
| 2,454,792 | Grieg | Nov. 30, 1948 |
| 2,454,815 | Levy | Nov. 30, 1948 |
| 2,465,380 | Labin | Mar. 29, 1949 |

FOREIGN PATENTS

| Number | Country | Date |
|---|---|---|
| 607,610 | Great Britain | Sept. 2, 1948 |

OTHER REFERENCES

"Pulse Time Modulated Multiplex Radio Relay System," Electrical Communications, vol. 23, pages 159–178, 1946.